(12) United States Patent
Lingala et al.

(10) Patent No.: US 10,827,336 B2
(45) Date of Patent: Nov. 3, 2020

(54) USING ACCESS CONTROL DEVICES TO SEND EVENT NOTIFICATIONS AND TO DETECT USER PRESENCE

(71) Applicant: CARRIER CORPORATION, Palm Beach Gardens, FL (US)

(72) Inventors: Ramesh Lingala, Telangana (IN); Venkata Narasimha Rao Chavala, Telangana (IN); Santhosh Amuduri, Telangana (IN); Hrishi Eathakota, Telangana (IN); Don Patrie Lobo, Telangana (IN)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 16/446,760

(22) Filed: Jun. 20, 2019

(65) Prior Publication Data
US 2020/0008038 A1 Jan. 2, 2020

(51) Int. Cl.
H04W 4/90 (2018.01)
H04M 1/725 (2006.01)
G06F 3/01 (2006.01)
H04W 4/021 (2018.01)
G07C 9/00 (2020.01)
(Continued)

(52) U.S. Cl.
CPC ............. *H04W 4/90* (2018.02); *G06F 3/017* (2013.01); *G07C 9/00571* (2013.01); *G07C 9/38* (2020.01); *G08B 7/00* (2013.01); *H04M 1/72572* (2013.01); *H04M 1/72577* (2013.01); *H04W 4/021* (2013.01)

(58) Field of Classification Search
CPC .......... H04W 4/90; H04W 4/021; G07C 9/38; G07C 9/00571; G07C 7/00; G06F 3/017; H04M 1/72572; H04M 1/72577
See application file for complete search history.

(56) References Cited

U.S. PATENT DOCUMENTS 2,592,606 A   4/1952  See et al.
6,317,042 B1  11/2001 Engelhorn et al.
(Continued)

FOREIGN PATENT DOCUMENTS

CN   106781228 A    5/2017
CN   207115680 U    3/2018
KR   101890303     10/2017

OTHER PUBLICATIONS

"Fire Alarm System", http://www.atss.in/fire-alarm-systems/, 10 pages.

Primary Examiner — Khai M Nguyen
(74) Attorney, Agent, or Firm — Cantor Colburn LLP

(57) ABSTRACT

A method of using access control devices to send event notifications and to detect user presence includes receiving a notification of an event. The receiving is at an access control device in a wireless mesh network and the notification is initiated by an originating computer. The access control device is at a geographic location. The notification of the event is broadcasted at the access control device. An indication of a presence of a user at a mobile device within proximity of the access control device is received at the access control device. The receiving is in response to the broadcasting and to an action of the user at the mobile device. The indication of the presence of the user and the geographic location is transmitted to the originating computer via the wireless mesh network.

14 Claims, 9 Drawing Sheets

(51) Int. Cl.
*G08B 7/00* (2006.01)
*G07C 9/38* (2020.01)

(56) References Cited

U.S. PATENT DOCUMENTS

| | | |
|---|---|---|
| 7,126,926 B1 | 10/2006 | Bjorklund et al. |
| 7,391,319 B1 | 6/2008 | Walker |
| 9,412,247 B2 | 8/2016 | Kore et al. |
| 9,514,585 B2 | 12/2016 | Ahearn et al. |
| 9,836,944 B2 | 12/2017 | Hwang et al. |
| 2009/0315669 A1 | 12/2009 | Lang et al. |
| 2016/0123741 A1 | 5/2016 | Mountain |
| 2017/0109981 A1 | 4/2017 | Joseph et al. |
| 2017/0124824 A1* | 5/2017 | Chan .................... G08B 25/008 |
| 2017/0180966 A1* | 6/2017 | Piett ........................ H04W 4/90 |
| 2018/0206083 A1* | 7/2018 | Kumar .................. H04W 4/021 |
| 2018/0365942 A1* | 12/2018 | Molloy .................. G01C 21/20 |
| 2019/0020978 A1* | 1/2019 | Finschi ................. H04W 4/029 |

\* cited by examiner

USING ACCESS CONTROL DEVICES TO SEND EVENT NOTIFICATIONS AND TO DETECT USER PRESENCE

CROSS-REFERENCE TO RELATED APPLICATIONS

This application claims the benefit of Indian Application No. 201811024454 filed Jun. 30, 2018, which is incorporated herein by reference in its entirety.

BACKGROUND

The subject matter disclosed herein generally relates to the field of access control systems, and more particularly to an apparatus and method for using access control devices to send event notifications and to detect user presence.

In the event of a fire in a public location such as a hotel, there are times when it can be difficult to alert hotel guests of the fire and/or to locate their presence. These difficulties can arise for example when sound alarms are not working or when a mobile device of a hotel guest does not have network connectivity. In either case, the hotel guest may not be alerted to the fire, and the hotel staff or fire rescue team may not know that the hotel guest is present in the hotel. Similarly, in the event of a lockdown of a school campus, there may be students stuck in classrooms and/or hidden and waiting for help from a security team. In these situations it can be difficult to locate the students and it is not desirable to call attention to the presence of the students by sending audible or haptic alerts to mobile devices.

In the event of a lockdown in a hotel or building, occupants who are in an elevator may not be aware of the lockdown situation. As a result, they may enter into a floor in which a lockdown has been declared. This might result in risk of the occupant's life. In addition, the occupants may not be aware of the safe floors/zones and exit paths to choose to evacuate the building on the event of the lockdown.

BRIEF SUMMARY

According to an embodiment, a method of using access control devices to send event notifications and to detect user presence includes receiving a notification of an event is provided. The receiving is at an access control device via a wireless mesh network and the notification is initiated by an originating computer. The access control device is at a geographic location. The notification of the event is broadcasted at the access control device. An indication of a presence of a user at a mobile device within proximity of the access control device is received at the access control device. The receiving is in response to the broadcasting and to an action of the user at the mobile device. The indication of the presence of the user and the geographic location is transmitted to the originating computer via the wireless mesh network.

In addition to one or more of the features described above or below, or as an alternative, further embodiments of the method may include the notification including an instruction for mobile devices to enter a specified state.

In addition to one or more of the features described above or below, or as an alternative, further embodiments of the method may include the specified state including a silent mode.

In addition to one or more of the features described above or below, or as an alternative, further embodiments of the method may include the specified state including emitting one or both of a voice alarm and a haptic alarm.

In addition to one or more of the features described above or below, or as an alternative, further embodiments of the method may include the notification further including an instruction for the access control device to enter a locked state and the method further comprises locking the access control device.

In addition to one or more of the features described above or below, or as an alternative, further embodiments of the method may include the action of the user including one or both of a mobile gesture of the mobile device and the user tapping on the mobile device.

In addition to one or more of the features described above or below, or as an alternative, further embodiments of the method may include the action of user including moving a privacy knob on the access control device.

In addition to one or more of the features described above or below, or as an alternative, further embodiments of the method may include the action of the user including a voice command.

In addition to one or more of the features described above or below, or as an alternative, further embodiments of the method may include the action of the user being captured by a smart camera.

In addition to one or more of the features described above or below, or as an alternative, further embodiments of the method may include the wireless mesh network includes a Bluetooth wireless mesh network.

In addition to one or more of the features described above or below, or as an alternative, further embodiments of the method may include that the event is a fire.

In addition to one or more of the features described above or below, or as an alternative, further embodiments of the method may include that the event is a lockdown.

According to another embodiment, a system is configured to use access control devices to send event notifications and to detect user presence. The system includes an access control device that includes a processor and a memory. The memory includes computer-executable instructions that, when executed by the processor, cause the processor to perform operations. The operations include receiving a notification of an event. The receiving is at the access control device via a wireless mesh network and the notification is initiated by an originating computer. The access control device is at a geographic location. The notification of the event is broadcasted at the access control device. An indication of a presence of a user at a mobile device within proximity of the access control device is received at the access control device. The receiving is in response to the broadcasting and to an action of the user at the mobile device. The indication of the presence of the user and the geographic location is transmitted to the originating computer via the wireless mesh network.

In addition to one or more of the features described above or below, or as an alternative, further embodiments of the system may include the notification including an instruction for mobile devices to enter a specified state.

In addition to one or more of the features described above or below, or as an alternative, further embodiments of the system may include the action of the user including at least one of a mobile gesture of the mobile device, tapping on the mobile device, and a voice command.

In addition to one or more of the features described above or below, or as an alternative, further embodiments of the system may include the action of the user is captured by a smart camera.

In addition to one or more of the features described above or below, or as an alternative, further embodiments of the system may include the wireless mesh network including a Bluetooth wireless mesh network.

In addition to one or more of the features described above or below, or as an alternative, further embodiments of the system may include that the event is one or both of a fire and a lockdown.

According to another embodiment, a method to control an elevator upon a lockdown event is provided. The method includes receiving a notification of a lockdown event, the receiving at an elevator control device of an elevator car. Information about the lockdown event is conveyed to occupants of the elevator car by the elevator control device via one or both of audio consoles and video consoles located in the elevator car. A destination of the elevator car is determined based at least in part on a present location of the elevator car and a location of the lockdown event. The elevator control device causes the elevator car to be moved to the destination. Information about an exit path from the elevator car that avoids the location of the lockdown event is conveyed by the elevator control device to the occupants of the elevator car.

In addition to one or more of the features described above or below, or as an alternative, further embodiments of the system may include that the notification of a lockdown event is received via a wireless mesh network.

Technical effects of embodiments of the present disclosure include the ability to provide immediate attention to a hotel guest through an alarm on a mobile device of the guest, thus providing a notification even when fire alarms in the hotel are not working and/or the hotel guest is not connected to a cellular network. Technical effects also include the ability to easily inform a rescue team of the presence and location of a hotel guest. Technical effects also include the ability to inform an individual of a lockdown event at a location and to inform a rescue team of the presence of the individual at the location without requiring a mobile device of the individual to be connected to a cellular network. Technical effects also include the ability to automatically put the mobile device of the individual into silent mode which can avoid calling attention to a location of the individual during a lockdown event. The ability for the individual to use gestures to indicate presence can avoid the false detection of the person when the person is in one place (e.g., a location in the building) and the mobile device associated with the individual is in another place (e.g., a different location or a vehicle). Technical effects of embodiments further include, upon being notified of a lockdown, conveying the lockdown information to occupants of an elevator car, moving the elevator car to a safe floor, and providing information about safe exit paths to occupants of the elevator car.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

Figure 1:
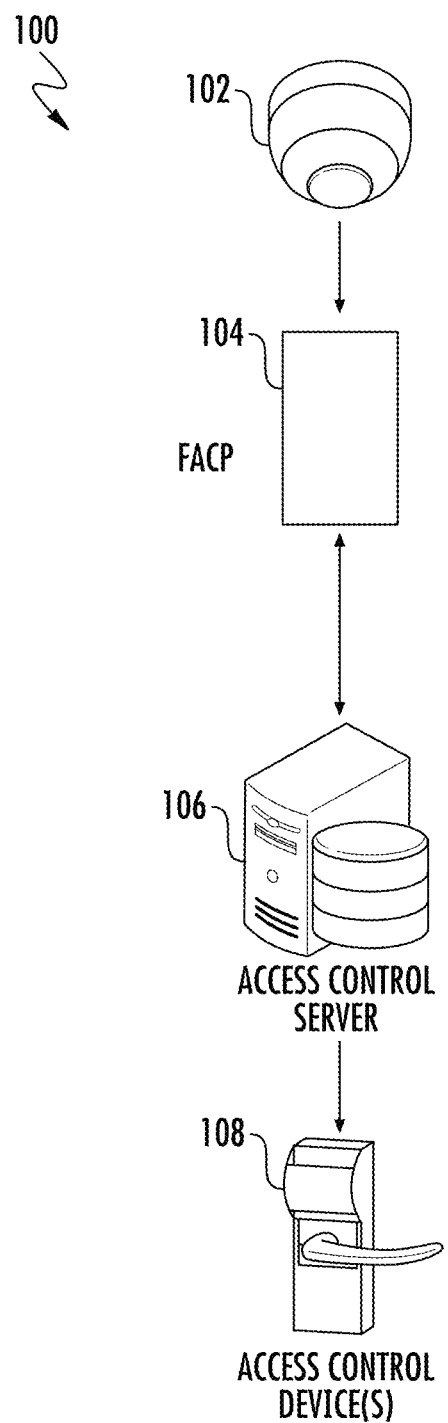
FIG. 1 illustrates a schematic diagram of sending fire notifications to access control devices, in accordance with an embodiment of the disclosure.

A detailed description of one or more embodiments of the disclosed apparatus and method are presented herein by way of exemplification and not limitation with reference to the Figures.

One or more embodiments of the present invention provide a system and method for notifying hotel guests and detecting their presence in the event of a fire. The notifying in one or more embodiments is via a Bluetooth mesh network formed using access control devices that control locks on hotel room doors. Access control devices in the Bluetooth mesh network broadcast notifications which are received by mobile devices of the hotel guest, or user, that are in proximity to the broadcasting access control devices (e.g., within the broadcast range) Notifications can be sent to hotel guests and presence information received from hotel guests via their mobile devices. In an embodiment, hotel guests use gestures to inform the system of their presence.

One or more embodiments of the present invention can be used in lockdown situations by including an instruction in the notifying that sets the mobile devices of the users into a silent mode, or state. Individuals involved in the lockdown situation can indicate their presence using gestures which can be communicated to a central location via the Bluetooth mesh network formed using access control devices that control locks on doors of the building in lockdown mode.

One or more embodiments of the present invention can be used in lockdown situations by including an elevator control panel that will send a special Bluetooth data packet notifying the elevator occupants via their mobile phones about the lock down event and driving them to the safe floors. Also, safe zone route maps can be displayed on elevator users' mobile phones to guide them to safe places. This display could be to any mobile device or electronic display.

On the event of a lockdown, all the door locks can convey this information to a main door lock through the Bluetooth mesh network, which will convey it to all elevator locks so that it is conveyed to each elevator control panel or server. The elevator server can guide the elevator cars to safe floors. In addition, the elevator control panel in the cabin or beacons in the cabin will start advertising with a special Bluetooth packet to convey, to all authorized user mobile phones, route maps to the safe zones. In another embodiment, the access control database and elevator server are interconnected. When a lockdown occurs, the access control database conveys this information to the elevator server so that it will start advertising with special Bluetooth packets to convey the safe zones along with safe zone route map to mobile phones of people in the elevators.

One or more embodiments can be utilized by home security panels, in smart homes and/or in office buildings. Wherein upon one of a lockdown event or a gun fire event, the access control panel conveys this information to the home security database so that it will get information to users in the building that conveys the lockdown situation and guides them to safe zones using a route map. In an embodiment, the information is communicated to all communication devices in the home or office building.

Turning now to FIG. 1, a schematic diagram of a system 100 for sending fire notifications to access control devices is generally shown in accordance with an embodiment of the disclosure. FIG. 1 through FIG. 4 will be described for the case where the event is a fire at a hotel. Embodiments of the present invention are not limited to hotel fires and can be utilized in any locations having access control devices (e.g., office building, apartment complex, etc.) to send notification of any type of event (e.g., lockdown, earthquake, flood, etc.)

The system 100 of FIG. 1 includes a smoke detector 102, a fire alarm control panel (FACP) 104, an access control server 106 including an access control database, and access control devices 108 that include a door locks. As shown in FIG. 1, the FACP 104 and the access control server 106 are in communication so that in the event of a fire, all of the access control devices 108 receive fire alert information through a Bluetooth mesh network formed by the access control devices 108. In an embodiment, the FACP 104 is connected using a wired connection and/or via a wireless network to several smoke detectors 102, or other fire detection devices. When the FACP 104 determines, based at least in part on input from the smoke detectors 102, that a fire event is occurring it can communicate the fire event to the access control server 106. In an embodiment, the FACP 104 is in communication with the access control server 106 directly using a wired connection and/or via a wireless network.

In an embodiment, upon being notified that a fire event is occurring, the access control server 106 can automatically (e.g., without user intervention) initiate the sending of a notification to each of the access control devices 108 in the hotel via the Bluetooth mesh network. In an embodiment, a hotel employee can also initiate the sending of the notification using, for example a user interface on the access control server 106.

Figure 2:
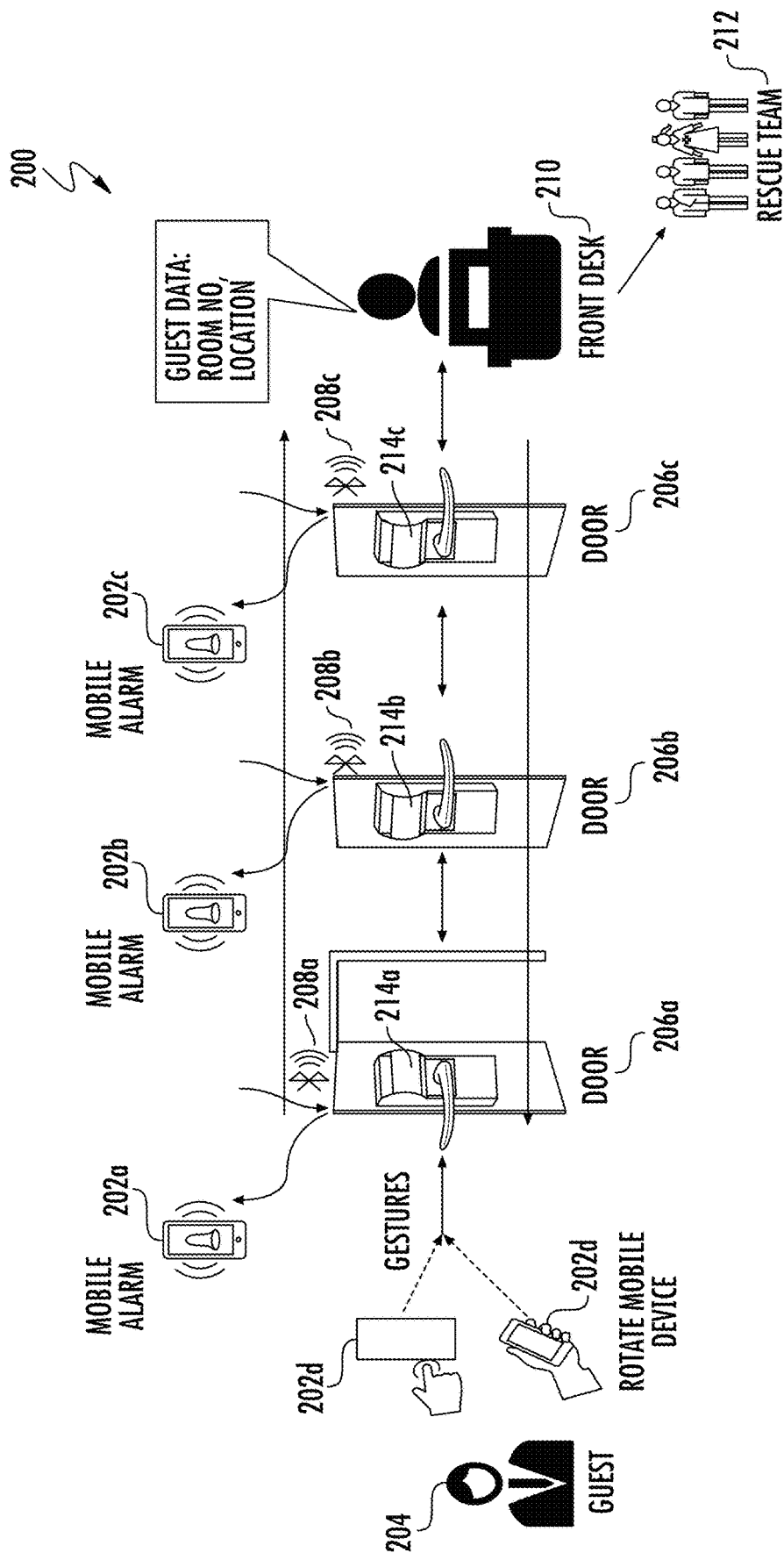
FIG. 2 illustrates a schematic diagram of sending fire alerts to mobile devices and receiving user location information, in accordance with an embodiment of the disclosure.

Turning now to FIG. 2, a schematic diagram of a system 200 for sending fire alerts, or notifications, to mobile devices and receiving user location information is generally shown in accordance with an embodiment of the disclosure. The system 200 of FIG. 2 includes a front desk 210 where an access control server such as access control server 106 of FIG. 1 is located, a plurality of doors 206 each having locks controlled by access control devices 214. The access control devices 214 emit Bluetooth signals 208 that are used to form a Bluetooth mesh network as well as to communicate with mobile devices 202 that are within a reception range of the Bluetooth signals 208 being broadcast by the access control devices 214. As shown in FIG. 2, the mobile devices 202 that are within a reception range of the Bluetooth signals 208 and that receive a broadcasted notification about a fire from the access control devices 214 emit a mobile alarm in response to receiving the notification. Also shown in FIG. 2 is a hotel guest 204 making gestures with a mobile device 202d associated with the guest to notify the front desk 210 of the presence of the hotel guest 204 proximate to access control device 214a. The indication of the presence of the hotel guest 204 and the location of the access control device 214a closest to the hotel guest 204 can be used by a fire rescue team 212 to locate the hotel guest 204.

In an embodiment, a Bluetooth mesh network is formed between the access control devices 214 to transmit a notification of a fire to each of the access control devices 214. In an embodiment, the originating computer that initiates the transmission of the fire notification to the access control devices 214 via the Bluetooth mesh network is a computer server such as access control server 106 of FIG. 1.

In an embodiment, once the fire event is notified to an access control device 214, the access control device 214 advertises with a special data packet, such as a Bluetooth low energy (BTLE), a notification of the fire event to nearby mobile devices 202. The notification can trigger a mobile device 202 to enter a state such as, but not limited to: a state that triggers a voice alarm, a state that causes the mobile device 202 to vibrate, a state that displays a short message service (SMS) or text message on the mobile device 202, and/or a state that requests the a mobile key application to prompt the hotel guest 204 for an input. As used herein, the term "mobile key application" refers to refers to an application in a mobile device 202 that is capable of communicating with a network and updates the key for a hotel room/door to gain access to access control device 214. An example of a mobile key application is DirectKey from Onity which allows a mobile phone to be used as a hotel room key.

In an embodiment, based at least in part on receiving the notification of the fire event on the mobile device 202d, the hotel guest 204 is prompted (or has been trained in advance) to notify the front desk 210 of his or her presence near access control device 214a using gestures. In an embodiment, a gesture can indicate the presence of the hotel guest 204, and can include but is not limited to: pressing an alert button in the mobile key application; moving the mobile device 202d in a particular manner; tapping on the mobile device 202d; and/or speaking into a microphone of the mobile device 202d. The indication of the presence and location of the hotel guest 204 can then be transmitted to the originating computer via the Bluetooth wireless mesh network. Using the presence indication described herein can be used as a verification that the hotel guest 204 is near the mobile device 202d.

The gesture can be communicated in cases where the hotel guest 204 is near the mobile device 202d but the mobile device 202d is not connected to a cellular or other wireless network. In an embodiment, the hotel guest 204 can inform the front desk 210 of his or her presence for example by rotating the mobile device 202d in a predefined pattern such as but not limited to ninety degrees to the right (+90°), followed by one hundred and eighty degrees to the left (−180°), followed by rotating back to the center (0°). The mobile key application can recognize this gesture as indicating the presence of the hotel guest 204 and pass the indication to access control device 214*a*. In an embodiment, the access control device 214*a* then passes the presence indication information including the geographic location of access control device 214*a* to access control device 214*b* which passes the presence indication information including the geographic location of access control device 214*a* to access control device 214*c*. Access control device 214*c* passes the presence indication information including the geographic location of access control device 214*a* to the front desk 210, or originating computer. In this manner a Bluetooth mesh network made up of access control devices 214*a* 214*b* 214*c* is utilized to pass presence information to the front desk.

Though three access control devices 214*a* 214*b* 214*c* are shown in the Bluetooth mesh network of FIG. 2, any number (tens, hundreds, thousands) of access control devices 214 can be included in a Bluetooth mesh network. The number of devices in the Bluetooth mesh network can depend, for example, on the number of rooms and/or doors in the hotel. In an embodiment additional Bluetooth beacons not shown in FIG. 2 and not part of an access control device 214 can also be included in the Bluetooth mesh network.

The geographic location can include global positioning system (GPS) coordinates of the access control device 214 and/or it can include an identifier of the access control device 214 which can be used by the originating computer to determine the geographic location of the access control device 214. The geographic location can also be specified in terms of hotel locations, such as a specific floor or hallway or room number.

Figure 3:
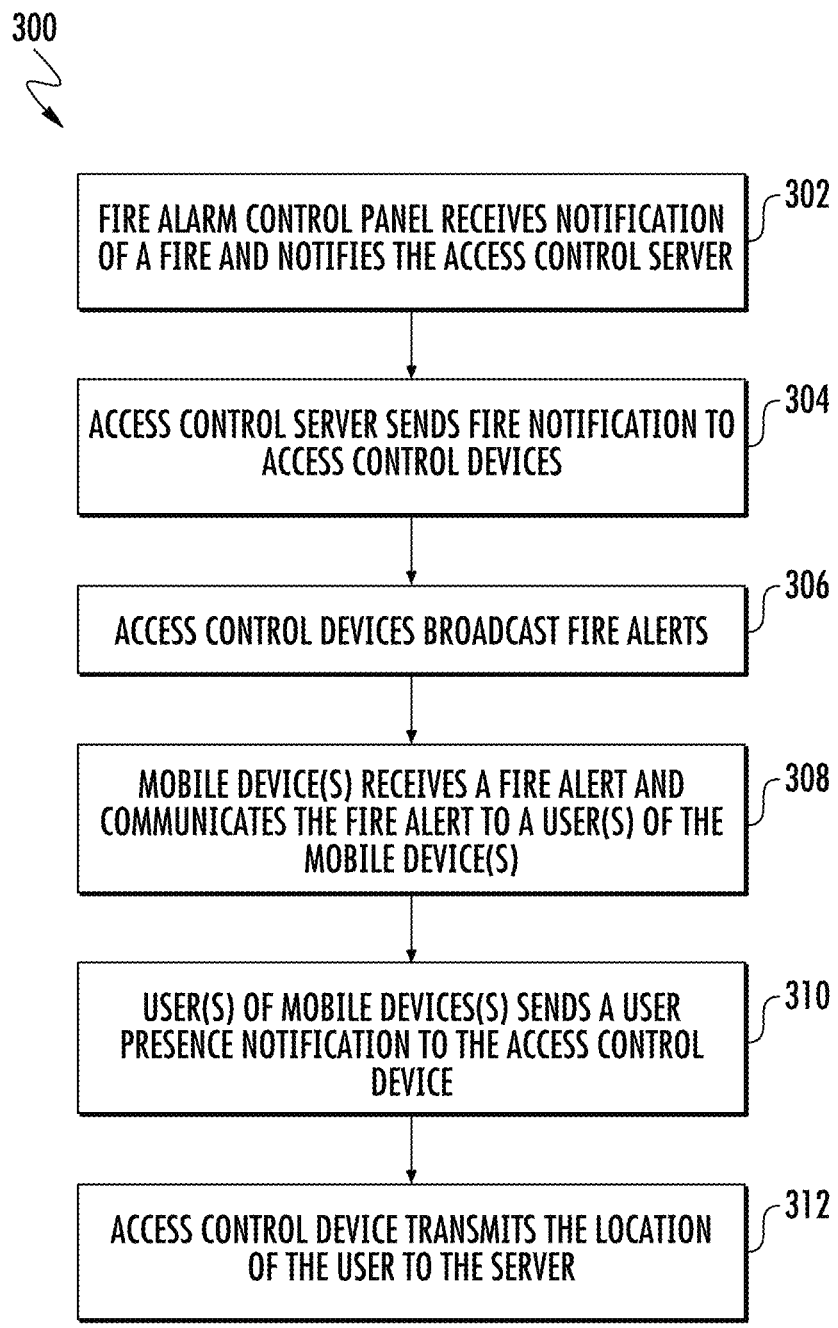
FIG. 3 is a flow diagram illustrating a method of sending fire alerts to mobile devices and receiving user location information, in accordance with an embodiment of the disclosure.

Turning now to FIG. 3, a flow diagram illustrating a method 300 of sending fire alerts to mobile devices and receiving user location information is generally shown in accordance with an embodiment of the disclosure. At block 302, a FACP, such as FACP 104 of FIG. 1 receives notification of a fire from, for example, a smoke detector, such as smoke detector 102 of FIG. 1 and communicates the fire event to a computer server, such as access control server 106 of FIG. 1. At block 304, the server, located for example at a front desk, sends the fire notification to the access control devices, such as access control devices 214 of FIG. 2, which form a Bluetooth mesh network.

At block 306, each access control device in the Bluetooth mesh network broadcasts fire alerts using a special BTLE packet which is received at block 308 by mobile devices that are within a transmission range of the Bluetooth signals broadcast by an access control device. The special BTLE packet is broadcast with special parameters in certain cases like when a fire alert and/or a lock down event happens. This is contrasted with the typical BTLE packet broadcast by the access control devices which identify the beacon location (e.g., hotel room number) as long a hotel guest comes within the range of the signal, the mobile application of the hotel guest identifies and displays the room number so that the hotel guest can request the door lock to open. The parameters in the messages broadcast from the beacons can be changed immediately upon being notified of an event that requires a special BTLE packet. The mobile devices communicate the fire alerts to users (e.g., hotel guests) of the mobile devices. As described previously with respect to FIG. 2, the receipt of a fire alert can cause a mobile device to enter a state such as a state that triggers a voice alarm and a state that causes the mobile device to vibrate. At block 310, a user, of the mobile device sends a user presence notification to the access control device using gestures to inform the originator of the fire notification of a location of the user. At block 312, the access control device transmits the location of the user to the server.

While the above description has described the flow process of FIG. 3 in a particular order, it should be appreciated that unless otherwise specifically required in the attached claims that the ordering of the steps may be varied.

Figure 4:
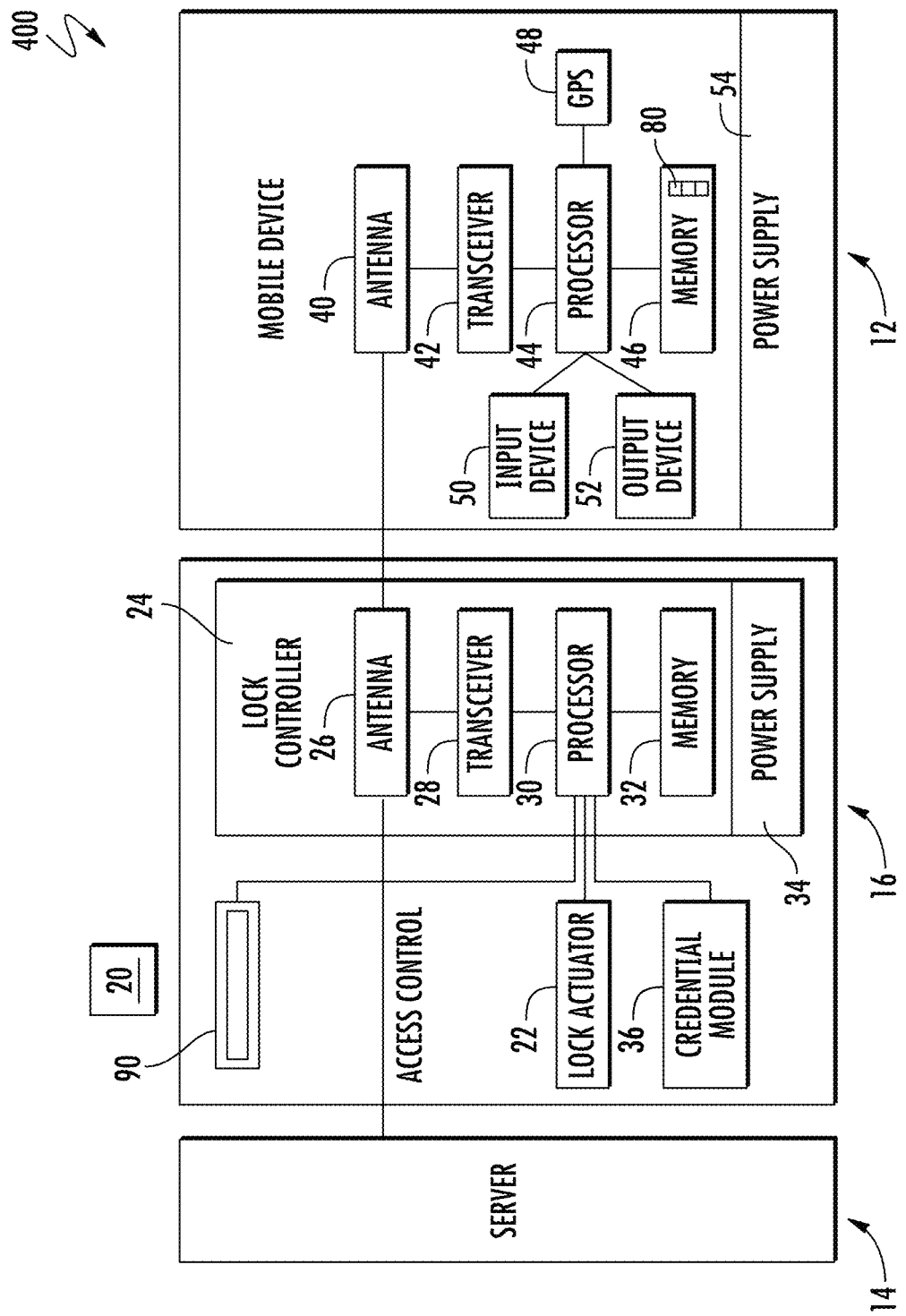
FIG. 4 illustrates a block diagram of an access control device, mobile device, and server of an access control system, in accordance with an embodiment of the disclosure.

Turning now to FIG. 4, a block diagram of an example electronic lock system 400 includes the access control device 16, the mobile device 12 and a server 14. In an embodiment the server 14 is implemented by the access control server 106 of FIG. 1. In an embodiment the mobile device 12 is implemented by the one of the mobile devices 202 of FIG. 2. In an embodiment the access control device 16 is implemented by one of the access control devices 214 of FIG. 2.

The access control device 16 generally includes a lock actuator 22, a lock controller 24, a lock antenna 26, a lock transceiver 28, a lock processor 30, a lock memory 32, a lock power supply 34, a lock card reader 90, and a credential module 36. The access control device 16 may have essentially two readers, one card reader 90 to read a physical key card 20 and the credential module 36 to communicate with the mobile device 12 via the lock processor 30 and the transceiver 28 and antenna 26. The access control device 16 is responsive to credentials from the mobile device 12, and may, for example, be the lock of a turnstile or a door lock. Although the present disclosure focuses primarily on credentials for access control, it should be appreciated that other systems wherein credentials are transmitted from a mobile device to an access control device so as to identify the user to an online system or validate user access rights or permissions in an offline system will benefit herefrom.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. In this manner, a lock state of the access control device 16 changes from one state to another state. The lock controller 24 and the lock actuator 22 may be parts of a single electronic or electro-mechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, infrared, Zigbee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36, and to receive a response indication back from the credential module 36. The lock memory 32 may be RAM, EEPROM, or other storage medium where the lock processor 30 can read and write. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 4 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna 26. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80 for implementing all or a subset of the processing described herein. Embodiments disclosed herein, may operate through the mobile device application 80 installed on the mobile device 12.

One or more embodiments of the present invention may also be used to silence phones and inform the presence of students to a front desk during a lockdown event. As used herein, the term lockdown event refers to an event in which all locks in a campus or building are locked for a predefine time. During a lockdown event it can be difficult to evacuate and move people around. In addition people (e.g., students) involved in lockdown events may be frightened to call attention to themselves or their hiding location.

Figure 5:
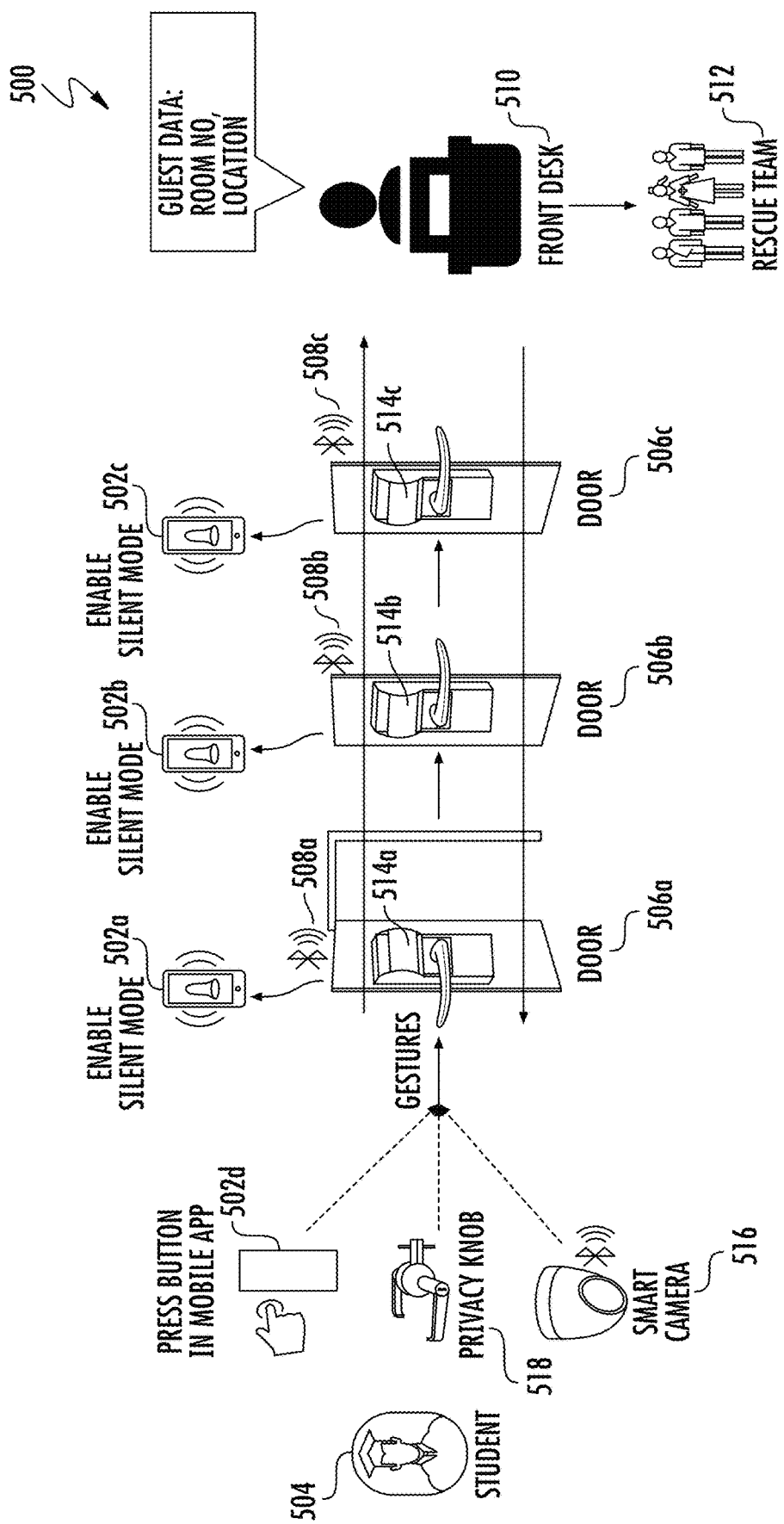
FIG. 5 illustrates a schematic diagram of sending lockdown alerts to mobile devices and receiving user location information, in accordance with an embodiment of the disclosure.

Turning now to FIG. 5, a schematic diagram of a system 500 for sending lockdown alerts to mobile devices and receiving user location information is generally shown in accordance with an embodiment of the disclosure. The system 500 of FIG. 5 includes a front desk 510 where an access control server such as server 14 of FIG. 4 is located, a plurality of doors 506 each having locks controlled by access control devices 514. The access control devices 514 emit Bluetooth signals 508 that are used to form a Bluetooth mesh network as well as to communicate with mobile devices 502 that are within a reception range of the Bluetooth signals 508 being broadcast by the access control devices 514. As shown in FIG. 5 the mobile devices 502 that are within a reception range of the Bluetooth signals 508 and that receive a broadcasted notification about a lockdown of a campus, such as a school campus, from the access control devices 514 enter a silent mode in response to receiving the notification.

Also shown in FIG. 5 is a student 504 making gestures with a mobile device 502d associated with the guest to notify the front desk 510 of the presence of the student 504 proximate to access control device 514a. Also shown in FIG. 5 is a privacy knob 518 on a lock of a door 506 which the student 504 can physically lock and a camera 516. The privacy knob 518 and the camera 516 can both transmit presence information to the front desk 510. The indication of the presence of the student 504 and the location of the access control device 514a closest to the student 504 can be used by a rescue team 512 to locate the student 504.

In an embodiment, a Bluetooth mesh network is formed between the access control devices 514 to transmit a notification of a lockdown to each of the access control devices 514. In an embodiment, the originating computer that initiates the transmission of the lockdown notification to the access control devices 514 via the Bluetooth mesh network is a computer server such server 106 of FIG. 1.

In an embodiment, once the lockdown event is notified to an access control device 514, the access control device 514 can put the lock included in the access control device 514 into a locked state. In an embodiment, once the lockdown event is notified to an access control device 514, the access control device 514 advertises with a special data packet, such as a Bluetooth low energy (BTLE), a notification of the lockdown event to nearby mobile devices 502. The notification can trigger a mobile device 502 to enter a state such as, but not limited to: a state that causes the mobile device 502 to enter a silent mode, a state that displays a short message service (SMS) or text message on the mobile device 502, and/or a state that requests the an application on the mobile device 502 to prompt the student 504 for an input. In an embodiment, the mobile device 502 prompts the person holding the mobile device (e.g., student 504) via a SMS alert and or prompting in a mobile key application that the mobile device 502 is in silent mode and the campus is in a lockdown. In an embodiment, the student can respond back with presence information is a number of ways such as, but not limited to predefined voice control; any natural input such shaking or vibrating the mobile device 502; rotating the mobile device; and/or a predefined text in message mode.

In an alternate embodiment, the mobile device 502 is put into a silent mode state via a message over a wireless network from the server 14 when the mobile device 502 is connected to the wireless network and the wireless network is operational. In another embodiment, the mobile device 502 enters a silent mode state based on receiving a message from another mobile device 502 (e.g., mobile device 502d receives a message from mobile device 502 to enter a silent mode state). As used herein, the term silent mode refers to a state where a mobile device 502 does not make any noise (e.g., no ring tones) or movement (e.g., does not vibrate).

In an embodiment, based at least in part on receiving the notification of the lockdown event on the mobile device 502d, the student 504 is prompted (or has been trained in advance) to notify the front desk 510 of his or her presence near access control device 514a using gestures. In an embodiment, a gesture can indicate the presence of the student 504, and can include but is not limited to: pressing an alert button in the mobile key application; moving the mobile device 502d in a particular manner; tapping on the mobile device 502d; and/or rotating a privacy switch, such as privacy knob 518, in a particular pattern. The indication of the presence and location of the student 504 can then be transmitted to the originating computer via the Bluetooth wireless mesh network. Using the presence indication described herein can be used as a verification that the student 504 is near the mobile device 502d.

The gesture can be communicated in cases where the student 504 is near the mobile device 502d but the mobile device 502d is not connected to a cellular or other wireless network. In an embodiment, the student 504 can inform the front desk 510 of his or her presence for example by rotating the mobile device 502d in a predefined pattern such as, but not limited to ninety degrees to the right (+90°), followed by one hundred and eighty degrees to the left (−180°), followed by rotating back to the center (0°). In an embodiment, the gesture includes the student 504 tapping on the display screen of the mobile device 502*d*. In an embodiment, if the student 504 does not have access to a mobile device 502 the gesture can include the student 504 rotating the privacy knob 518 in a predefined pattern such as, but not limited to two rotations clockwise. In an embodiment, a Bluetooth enabled smart camera 516 can include a motion detection sensor that detects motion by visually recognizing people, identifying their gestures, and then based on their gestures alerting the front desk 510. A student can initiate a predefined gesture to a camera so that it can inform the lock via the Bluetooth interface so that the lock in turn can pass this presence information to the next lock until it reaches the front desk. In addition, or alternatively, if the camera is online, then the access server can inform the locks via a Bluetooth mesh or the access server can directly communicate with the camera so that camera can inform all mobile devices to enter a silent state. The system can recognize one or more of these gestures as indicating the presence of the student 504 and pass the indication to access control device 514*a*.

In an embodiment, the access control device 514*a* then passes the presence indication information including the geographic location of access control device 514*a* to access control device 514*b* which passes the presence indication information including the geographic location of access control device 514*a* to access control device 514*c*. Access control device 514*c* passes the presence indication information including the geographic location of access control device 514*a* to the front desk 510, or originating computer. In this manner a Bluetooth mesh network made up of access control devices 514*a* 514*b* 514*c* is utilized to pass presence information to the front desk.

Though three access control devices 514*a* 514*b* 514*c* are shown in the Bluetooth mesh network of FIG. 5, any number (tens, hundreds, thousands) of access control devices 514 can be included in a Bluetooth mesh network. In an embodiment additional Bluetooth beacons not shown in FIG. 5 and not part of an access control device 514 can also be included in the Bluetooth mesh network.

The geographic location can include global positioning system (GPS) coordinates of the access control device 514 and/or it can include an identifier of the access control device 514 which can be used by the originating computer to determine the geographic location of the access control device 514. The geographic location can also be specified in terms of school campus, such as a specific floor or hallway or room number.

Figure 6:
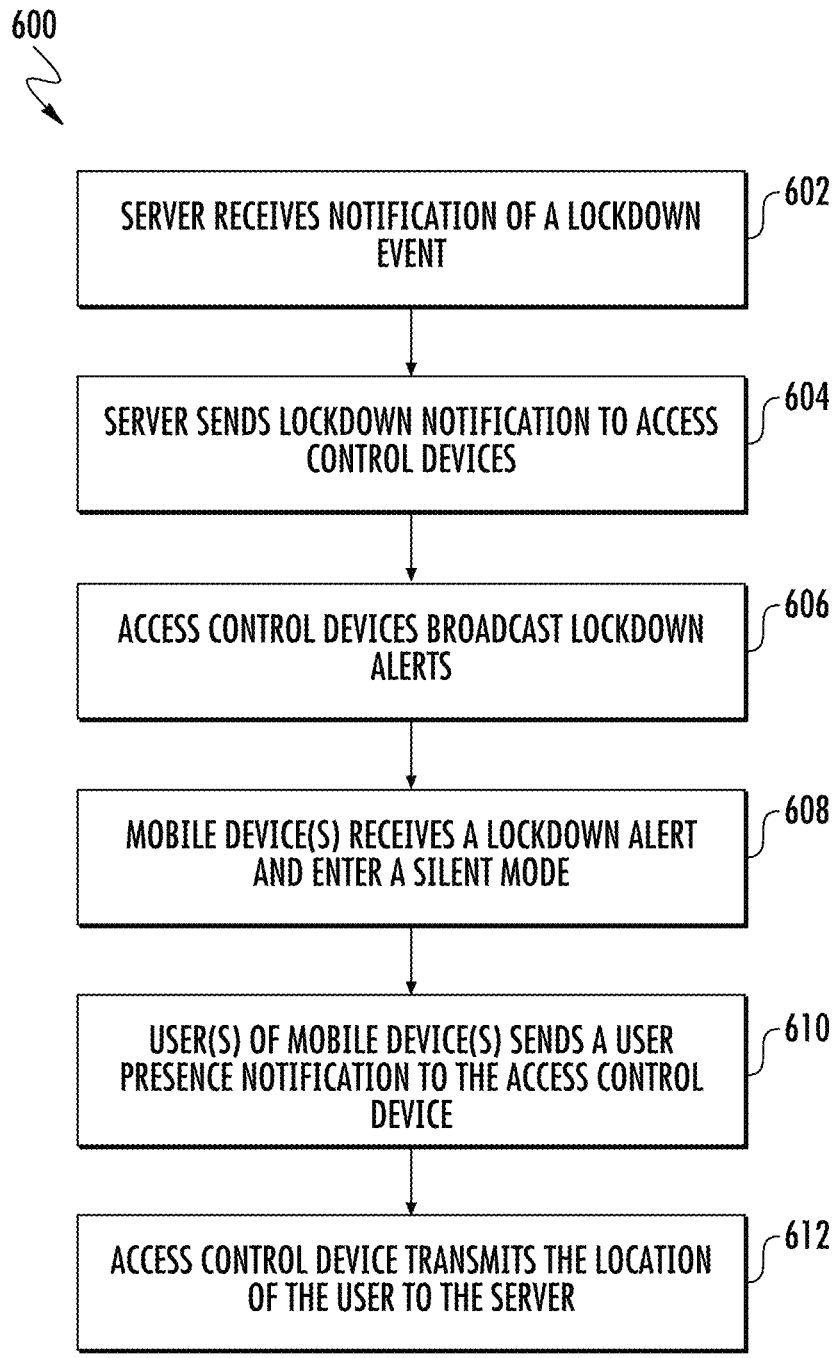
FIG. 6 is a flow diagram illustrating a method of sending lockdown alerts to mobile devices and receiving user location information, in accordance with an embodiment of the disclosure.

Turning now to FIG. 6, a flow diagram 600 illustrating a method of sending lockdown alerts to mobile devices and receiving user location information is generally shown in accordance with an embodiment of the disclosure. At block 602, a server, such as server 14 of FIG. 4, receives notification of a lockdown event. At block 604, the server located for example at a front desk, sends the lockdown event notification to the access control devices, such as access control devices 514 of FIG. 5, which form a Bluetooth mesh network.

At block 606, each access control device in the Bluetooth mesh network broadcasts lockdown alerts using a special BTLE packet which is received at block 608 by mobile devices that are within a transmission range of the Bluetooth signals broadcast by an access control device. The mobile devices communicate the lockdown alerts to users (e.g., students) of the mobile devices. As described previously with respect to FIG. 5, the receipt of a lockdown alert can cause a mobile device to enter a state such as a silent state.

At block 610, a user, of the mobile device sends a user presence notification to the access control device using gestures to inform the originator of the lockdown notification of a location of the user. At block 612, the access control device transmits the location of the user to the server.

While the above description has described the flow process of FIG. 6 in a particular order, it should be appreciated that unless otherwise specifically required in the attached claims that the ordering of the steps may be varied.

While embodiments have been described herein in terms of a hotel and a school campus, it will be appreciated that embodiments can be utilized in any environment where access control devices are utilized such as, but not limited to office building and apartment buildings.

Figure 7:
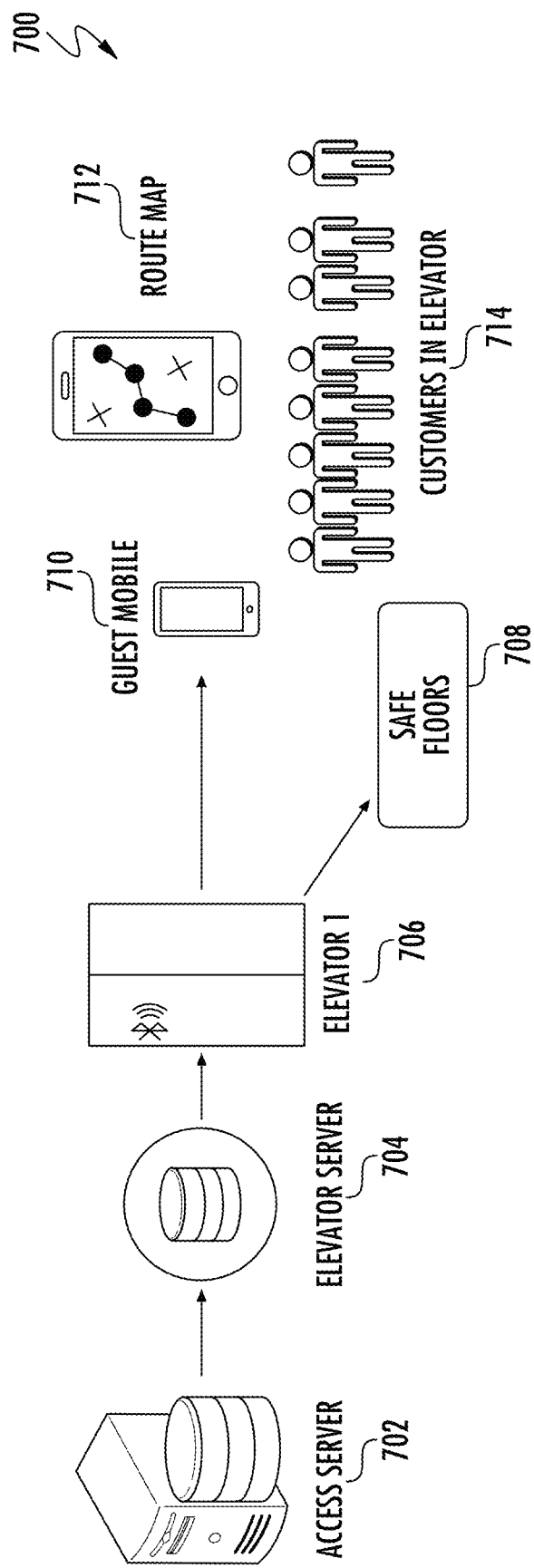
FIG. 7 illustrates a schematic diagram of sending lockdown alerts to elevator control panels, in accordance with an embodiment of the disclosure.

Turning now to FIG. 7, a schematic diagram of a system 700 for sending lockdown alerts to elevator control panels is generally shown in accordance with an embodiment of the disclosure. As shown in FIG. 7, when an access server 702 is notified of a lockdown event it notifies elevator server 704. The elevator server 704 conveys a notification about the lockdown event to a control panel(s) in an elevator car(s) 706, via Bluetooth for example. The control panel(s) in the elevator car(s) 706 can use the information about the lockdown event to guide the elevator car(s) 706 to safe floors 708. In addition, the elevator control panel can send a special Bluetooth data packet notifying customers in the elevator 714 via a customer mobile device(s) 710. In addition, the system can send a safe zone route map 712 for display on an electronic display such as a display on mobile device 710 to guide the customers in the elevator 714 to safe places.

Figure 8:
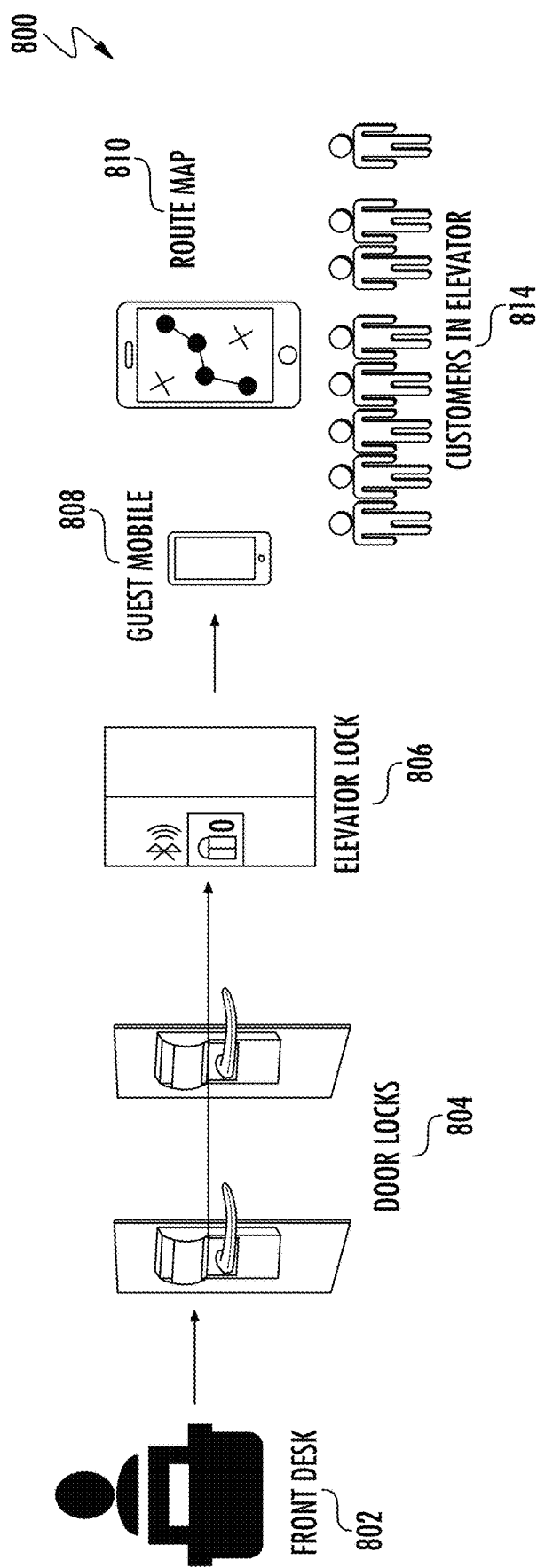
FIG. 8 illustrates a schematic diagram of sending lockdown alerts to elevator control panels, in accordance with an embodiment of the disclosure.

Turning now to FIG. 8, a schematic diagram of a system 800 for sending lockdown alerts to elevator control panels is generally shown in accordance with an embodiment of the disclosure. As shown in FIG. 8, when someone at a front desk 802 is notified of a lockdown event, they convey a notification about the lockdown event to all door locks 804 and to an elector lock 806 in an elevator car. A control panel in the elevator car can use the information about the lockdown event to guide the elevator car to safe floors. In addition, the elevator control panel can send a special Bluetooth data packet notifying customers in the elevator 812 via a customer mobile device(s) 808. In addition, the system can send a safe zone route map 810 for display on an electronic display such as a display on mobile device 808 to guide the customers in the elevator to safe places.

Figure 9:
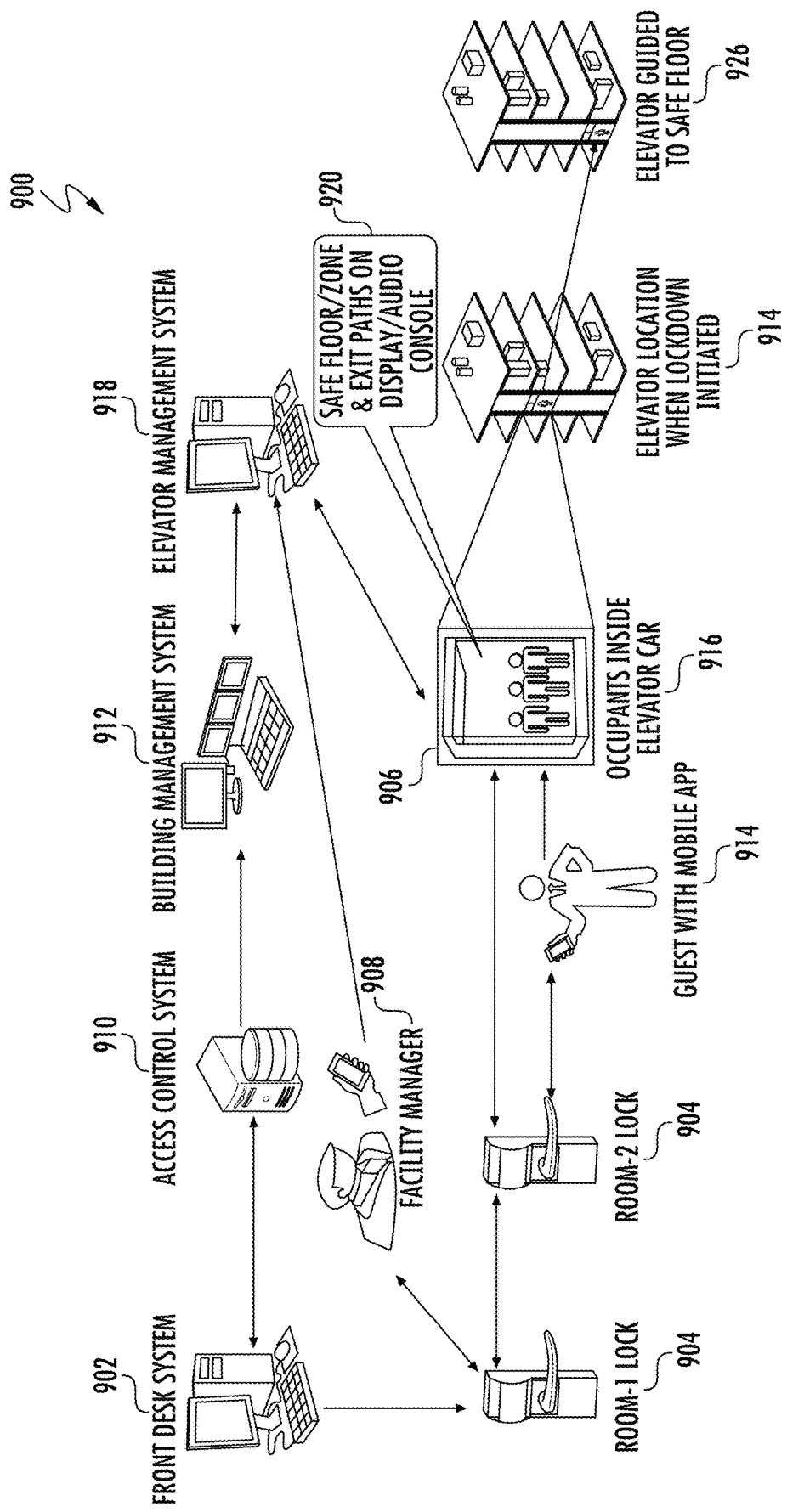
FIG. 9 illustrates a schematic diagram of controlling elevators and conveying safe floor/zone, exit paths to elevator occupants upon lockdown, in accordance with an embodiment of the disclosure.

Turning now to FIG. 9, a schematic diagram 900 of controlling elevators and conveying safe floor/zone, exit paths to elevator occupants upon lockdown is generally shown in accordance with an embodiment of the disclosure. As shown in FIG. 9, a lockdown is conveyed to room locks 904 and access control system 910 by front desk system 902. In accordance with an embodiment, the room locks 904 are connected in a Bluetooth mesh network which is used to convey the lockdown among all of the locks 904 in the hotel (or building). In addition, as shown in FIG. 9, a lock 904 can also convey the lockdown to mobile device of a facility manager 908. In an embodiment, the facility manager 908 can convey the lockdown information directly to an elevator management system (EMS) 918 and room locks 904, provided the facility manager 908 has the lockdown information. In this case, the facility manager 908 will be the initiator to trigger the lockdown. As shown in FIG. 9, access control system 910 conveys the lockdown to building management system (BMS) 912.

In an embodiment, the lockdown can be conveyed to the elevator 906 by the BMS 912 conveying the lockdown to EMS 918 which then notifies the elevator 906. Alternatively, the facility manager 908 can convey the lockdown directly to the EMS 918 via a mobile application. Another way that the lockdown can be conveyed to the elevator 906 is that the locks 904 can directly convey to the elevator 906 which in turn informs the EMS 918 and other elevators. A further way to convey the lockdown to the elevator 906 is that the locks 904 can convey to the elevator 906 via a mobile device of a nearby guest 914 which in turn notifies EMS 918 and other elevators.

In an embodiment, the EMS 918 controls the elevator 906 and provides lockdown and safety information to the occupants inside the elevator car 916 via displays and/or audio consoles 920. The lockdown and safety information can also be shown on user interfaces of mobile phones of registered users as well as any other personal displays of registered users. The EMS 918 can decide a safe destination for the elevator 906 based on a present elevator location 924 and the floor in which the lockdown has been declared. The elevator 906 is taken to a safe floor/zone 926 by the EMS 918 and provides the occupants inside the elevator car 916 with exit paths to evacuate or exit paths to safe zones.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for using access control devices to send event notifications and to detect user presence, the method comprising:
   receiving a notification of an event, the receiving at an access control device via a wireless mesh network, the notification initiated by an originating computer and the access control device at a geographic location, the notification comprising an instruction for mobile devices to enter a silent mode state;
   broadcasting, at the access control device, the notification of the event;
   receiving, at the access control device, an indication of a presence of a user at a mobile device within a proximity of the access control device, the receiving in response to the broadcasting and to an action of the user at the mobile device, wherein the mobile device is in the silent mode state in response to the instruction in the notification; and
   transmitting the indication of a presence of a user and the geographic location to the originating computer via the wireless mesh network.

2. The method of claim 1, wherein the notification further comprises an instruction for the access control device to enter a locked state and the method further comprises locking the access control device.

3. The method of claim 1, wherein the action of the user comprises one or both of a mobile gesture of the mobile device and the user comprises tapping on the mobile device.

4. The method of claim 1, wherein the action of the user comprises moving a privacy knob on the access control device.

5. The method of claim 1, wherein the action of the user comprises a voice command.

6. The method of claim 1, wherein the action of the user is captured by a smart camera.

7. The method of claim 1, wherein the wireless mesh network comprises a Bluetooth wireless mesh network.

8. The method of claim 1, wherein the event is a fire.

9. The method of claim 1, wherein the event is a lockdown.

10. A system for using access control devices to send event notifications and to detect user presence, the system comprising an access control device, the access control device at a geographic location and comprising:
    a processor; and
    a memory comprising computer-executable instructions that, when executed by the processor, cause the processor to perform operations, the operations comprising:
      receiving a notification of an event, the receiving at the access control device via a wireless mesh network, the notification initiated by an originating computer, the notification comprising an instruction for mobile devices to enter a silent mode state;
      broadcasting, at the access control device, the notification of the event;
      receiving, at the access control device, an indication of a presence of a user at a mobile device within a proximity of the access control device, the receiving in response to the broadcasting and to an action of the user at the mobile device, wherein the mobile device is in the silent mode state in response to the instruction in the notification; and transmitting the indication of a presence of a user and the geographic location to the originating computer via the wireless mesh network.

11. The system of claim 10, wherein the action of the user comprises at least one of a mobile gesture of the mobile device, tapping on the mobile device, and a voice command.

12. The system of claim 10, wherein the action of the user is captured by a smart camera.

13. The system of claim 10, wherein the wireless mesh network comprises a Bluetooth wireless mesh network.

14. The system of claim 10, wherein the event is one or both of a fire and a lockdown.

* * * * *